(12) United States Patent
Tosi (10) Patent No.: US 9,010,441 B2
(45) Date of Patent: Apr. 21, 2015

(54) SYSTEMS AND METHODS FOR RESERVOIR PRODUCTION MANAGEMENT

(75) Inventor: Luis Phillipe Tosi, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 259 days.

(21) Appl. No.: 13/604,802

(22) Filed: Sep. 6, 2012

(65) Prior Publication Data

US 2013/0240205 A1 Sep. 19, 2013

Related U.S. Application Data

(60) Provisional application No. 61/533,402, filed on Sep. 12, 2011.

(51) Int. Cl.
*E21B 47/10* (2012.01)
*E21B 43/14* (2006.01)

(52) U.S. Cl.
CPC .............. *E21B 47/102* (2013.01); *E21B 43/14* (2013.01)

(58) Field of Classification Search
USPC ...................... 166/369, 250.15, 250.16, 252.2
See application file for complete search history.

(56) References Cited

U.S. PATENT DOCUMENTS

| | | | |
|---|---|---|---|
| 6,435,030 B1 * | 8/2002 | Gysling et al. ................ 73/587 |
| 6,766,854 B2 | 7/2004 | Ciglenec et al. | |
| 7,219,729 B2 * | 5/2007 | Bostick et al. ........... 166/250.01 |
| 7,508,506 B2 | 3/2009 | Christian et al. | |
| 7,826,050 B2 | 11/2010 | DiFoggio et al. | |
| 7,907,277 B2 | 3/2011 | Csutak | |
| 2003/0192689 A1 | 10/2003 | Moake et al. | |
| 2008/0078544 A1 | 4/2008 | Christian et al. | |
| 2010/0231905 A1 | 9/2010 | Christian et al. | |
| 2011/0042072 A1 | 2/2011 | Villegas et al. | |
| 2011/0251795 A1 * | 10/2011 | DiFoggio ..................... 702/11 |
| 2012/0312560 A1 * | 12/2012 | Bahr et al. ................... 166/387 |
| 2013/0032545 A1 * | 2/2013 | Freese et al. ................ 210/739 |

FOREIGN PATENT DOCUMENTS

WO 2010097782 A1 9/2010
WO 2011130136 A2 10/2011

OTHER PUBLICATIONS

International Search Report of corresponding counterpart international application No. PCT/US2012/054063 dated Mar. 18, 2013.

(Continued)

*Primary Examiner* — William P Neuder
(74) *Attorney, Agent, or Firm* — John Vick (57) ABSTRACT

A reservoir production management system includes a plurality of dielectric spectrometers disposed at different locations along the length of production tubing within a wellbore, each of the plurality dielectric spectrometers being in fluid communication with separate producing zones of the reservoir, wherein the plurality of dielectric spectrometers are configured to detect one or more dielectric properties by measuring the response of incident radio waves through fluids from each of the respectively separate producing zones, and a plurality of valves in the production tubing to selectively control production from each of the respectively separate producing zones in response to detected dielectric fluid properties.

20 Claims, 5 Drawing Sheets

(56) References Cited

OTHER PUBLICATIONS

Asami, Koji. "Characterization of Heterogeneous Systems by Dielectric Spectroscopy." Progress in Polymer Science. Institute for Chemical Research, Kyoto University. 27 (Feb. 25, 2002): 1617-1659.

* cited by examiner

SYSTEMS AND METHODS FOR RESERVOIR PRODUCTION MANAGEMENT

CROSS-REFERENCE TO RELATED APPLICATIONS

This patent application claims priority under 35 USC §119 (e) to provisional patent application Ser. No. 61/533,402, filed Sep. 12, 2011, which is incorporated herein by reference in its entirety.

BACKGROUND OF THE INVENTION

A. Field of the Invention

Embodiments of the present disclosure relate to systems and methods for analysis of production fluids in a wellbore using dielectric spectroscopic techniques. More particularly, embodiments disclosed herein relate to systems and methods using dielectric spectroscopic techniques for reservoir production management.

B. Background and Summary of the Invention

In the production of oil and gas from a reservoir having multiple producing zones, it may be important to characterize the fluids produced within each producing zone for a variety of reasons. Mixtures of water, gas, and oil may be produced in varying quantities from respective zones within a subterranean formation. Operators may find a need to characterize the types of fluids flowing into the wellbore from various producing zones within a well. Accordingly, there is a need for a system and method to detect fluid properties from each producing zone, and selectively produce fluids from each of the producing zones.

In one embodiment, the invention relates to a reservoir production management system including a plurality of dielectric spectrometers disposed at different locations along the length of production tubing within a wellbore, each of the plurality dielectric spectrometers being in fluid communication with separate producing zones of the reservoir, wherein the plurality of dielectric spectrometers are configured to detect one or more dielectric properties by measuring the response of incident radio waves through fluids from each of the respectively separate producing zones, and a plurality of valves in the production tubing to selectively control production from each of the respectively separate producing zones in response to detected dielectric fluid properties.

In another embodiment, the invention relates to a reservoir production management system including a first dielectric spectrometer disposed at a first location along the length of production tubing in a wellbore, the first dielectric spectrometer being in fluid communication with a first producing zone of the reservoir, wherein the first dielectric spectrometer is configured to detect one or more dielectric properties by measuring the response of incident radio waves through fluids from the first producing zone, a second dielectric spectrometer disposed at a second location along the length of production tubing in the wellbore, the second dielectric spectrometer being in fluid communication with a second producing zone of the reservoir, wherein the second dielectric spectrometer is configured to detect one or more dielectric properties by measuring the response of incident radio waves through fluids from the second producing zone, and one or more valves in the production tubing to selectively produce from either or both the first or second producing zones in response to detected dielectric fluid properties.

In yet another embodiment, the invention relates to a method of managing reservoir production including providing a plurality of dielectric spectrometers at different locations along the length of production tubing in a wellbore, each of the plurality dielectric spectrometers being in fluid communication with separate producing zones of the reservoir, measuring a response of incident radio waves through fluid with the plurality of dielectric spectrometers to fluids flowing therethrough from each of the separate producing zones, detecting one or more dielectric fluid properties with the plurality of dielectric spectrometers, and selectively producing fluid from one or more of the separate producing zones in response to detected dielectric fluid properties.

DETAILED DESCRIPTION OF THE INVENTION

The foregoing aspects, features, and advantages of the present invention will be further appreciated when considered with reference to the following description of preferred embodiments and accompanying drawings, wherein like reference numerals represent like elements. In describing embodiments of the invention illustrated in the appended drawings, specific terminology will be used for the sake of clarity. However, the invention is not intended to be limited to the specific terms used, and it is to be understood that each specific tem may include equivalents that operate in a similar manner to accomplish a similar purpose.

Dielectric spectroscopy may be employed to analyze fluids in situ within production tubing or casing of a wellbore. Dielectric radio-spectroscopy ("DRS") characterizes the dielectric properties of matter as a function of input frequency. Characterization of downhole fluids such as water, oil, gas ratios, densities, and other fluid properties may be determined by application of DRS from one or more fixed positions in a wellbore. Signal analysis techniques may be used to infer the density and composition of multiphase fluids. The data received in such analysis may be employed to improve or maximize oil reserves, to prevent safety hazards, or to increase the lifetime of hardware within a wellbore.

Permittivity is a measure of the ability of a material to polarize in response to an electric field and, thereby, reduce the total electric field inside the material. In addition, the permittivity of a material is a quantity used to describe the material's dielectric properties that influence reflection of electromagnetic waves at interfaces and the attenuation of wave energy within the material. Hence, permittivity of a material may be determined by measuring the polarization of the material in response to an applied electric field, or by measuring reflection of electromagnetic waves by the material and wave energy dissipation in the material.

The permittivity, in the frequency domain, is generally a complex number and may be measured in several ways. One way is to apply an alternating current (AC) or field voltage to the sample using two electrodes that form a configuration similar to that of a capacitor. The resulting electrical current flowing through the sample is measured. The permittivity is then derived from the in-phase current and the out-of-phase current. The frequency of the applied voltage is generally in the radio-frequency range, and thus, it avoids the need for a typical optical photodetector with its inherent disadvantages in a high-temperature environment.

Another way to measure permittivity is to dispose the sample in a waveguide and subject the sample to radiofrequency (RF) electromagnetic (EM) waves emitted from a transducer or antenna. The resulting EM waves reflected by the sample and transmitted through the sample are measured. From the reflected EM wave measurements and the transmitted EM wave measurements, the permittivity of the sample may be derived.

A wide range of molecules and atoms may make up a formation fluid. These molecules and atoms may have polar structures, which are affected by electric fields. In general, the polar structures may have different masses and structures that are affected uniquely by AC electromagnetic energy of a certain frequency transmitted into the formation fluid. Examples of responses of the atoms and/or molecules include vibration, rotation, displacement, and dipole inducement. The frequency dependence results from the formation fluid not responding instantaneously to the applied electric field, but responding as a function of time. Hence, the chemical composition of the formation may be identified by transmitting electromagnetic energy into the sample of the fluid at a plurality of frequencies and measuring resulting responses. In particular, the magnitude and/or phase of a response may be increased at a resonant frequency and the chemical composition may be identified by determining the frequencies where resonances occur.

Because a response includes detecting electric or electromagnetic energy having a magnitude and phase with respect to the transmitted electromagnetic energy, the permittivity is represented as a complex number having a real component (i.e., the dielectric constant) and an imaginary component. In certain embodiments, the real component relates to energy stored within the formation fluid when the fluid is exposed to an electric field and the imaginary component relates to the dissipation of energy (i.e., absorption and attenuation) within the formation fluid. Equation (1) provides a mathematical representation of permittivity "e" as a complex number where e' represents the real component, e" represents the imaginary component, and ω is the angular frequency.

$$e(\omega) = e'(\omega) + ie''(\omega) \tag{1}$$

Equation (1) may be rewritten as equation (2) where $D_0$ is the magnitude of the electric displacement field, $E_0$ is the magnitude of the electric field, and δ is the phase difference between $D_0$ and $E_0$.

$$e(\omega) = (D_0/E_0)(\cos \delta + i \sin \delta) \tag{2}$$

Formation fluids may include oil, water, and natural gas. Natural gas is composed almost entirely of nonpolar compounds (e.g., methane, ethane, propane, butane, etc.) and has few if any polar compounds such as asphaltenes. Crude oils, however, include many polar compounds, especially asphaltenes, which lead to dielectric dispersions (i.e., changes in dielectric constant with frequency). For crude oils, the magnitude of the peak of the imaginary component e" of permittivity, generally 1.8 to 2.0, over a range of 1 MHz to 100 MHz is an indication of the amount of asphaltenes in the crude oil. Thus, by measuring the amount of asphaltenes crude oil, the quality of the crude oil may be classified as light, medium, or heavy oil. Use of higher frequencies such as 1 GHz may allow easy discrimination of oil (with a dielectric constant of approximately 2) compared to water (with a dielectric constant of approximately 80). By detecting changes in the chemical identity of the formation fluid in various producing zones of a reservoir, overall production of a well may be optimized.

Certain definitions are now presented. The term "radio-frequency" relates to frequencies below frequencies of light such that a photodetector is not required for detection or quantification of a received signal in the frequency range of interest. The term "dielectric spectrometer" relates to an apparatus for measuring a dielectric constant of a formation fluid by transmitting electromagnetic energy into the fluid at a plurality of frequencies in order to determine the dielectric constant as a function of frequency. The frequencies are in a range of frequencies that correlate to resonances of materials that may be expected present in the fluid.

Different frequency ranges may require different structural geometries for the spectrometer design. That is, some geometrical arrangements of the spectrometer will be ideal for certain frequency analysis, while other geometries will be ideal for other frequencies. The DRS apparatus measures the dielectric relaxation phenomenon that occurs when a fluid is exposed to an alternating electromagnetic field as a function of the change in the alternating cycles (i.e., increased frequency). Dielectric spectra may be obtained over a frequency range of approximately 1 Hz to up to 10 GHz using rapid, automated, frequency-domain spectrometers (FDS) with high precision. For example, in certain instances, dielectric spectra may be obtained at frequencies of as low as approximately 1 Hz, 100 Hz, 1 KHz, 1 MHz or 100 MHz, and up to frequencies as high as approximately 500 MHz, 1 GHz, 5 GHz or 10 GHz. Additionally, time-domain spectrometers may be used for improved accuracy and shorter time required for measurements than FDS, thereby allowing faster investigation of phenomena.

Figure 1A:
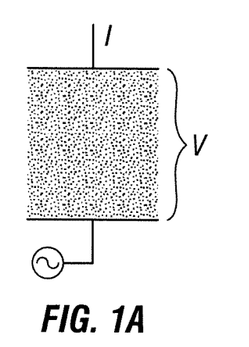
FIG. 1 illustrates various electrode configurations of dielectric spectrometers in accordance with one or more embodiments of the present disclosure.
Figure 1B:
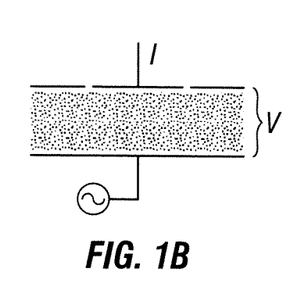
Figure 1C:
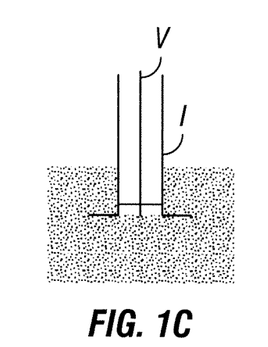

For measurements at frequencies below 10 MHz, for example, measuring cells of parallel-plate capacitor type may be used (FIG. 1a). The measuring cells may require correction for the residual inductance and capacitance arising from the cell itself and the connecting leads. If a fringing field at the ends of parallel plate electrodes causes an error, the three-terminal method may be effective for its elimination (FIG. 1b). Open-ended coaxial probes may be suited for measurements with network analyzers and time domain reflectometers at frequencies above 100 MHz. (FIG. 1c).

Figure 1D:
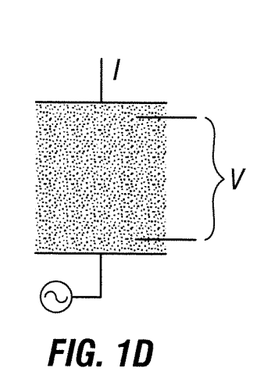
Figure 1E:
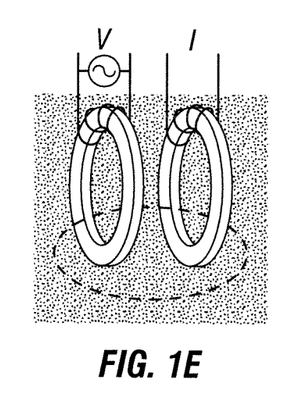

Samples containing electrolytes may have a problem at frequencies below 10 KHz owing to electrode polarization, i.e., the impedance at the boundary between metal electrodes and electrolyte solutions. To eliminate the electrode polarization effect, some measurement techniques such as the four-electrode method (FIG. 1d) and the electromagnetic induction method with a pair of toroidal coils (FIG. 1e) may be used. Their application may be limited to high frequency ranges however.

Moreover, single-particle analysis electromechanical techniques, such as electrorotation and dielectrophoresis, may be used rather than conventional dielectric spectroscopy. Alternatively, imaging techniques with a scanning fine probe may also be available in single-particle analysis.

Figure 2:
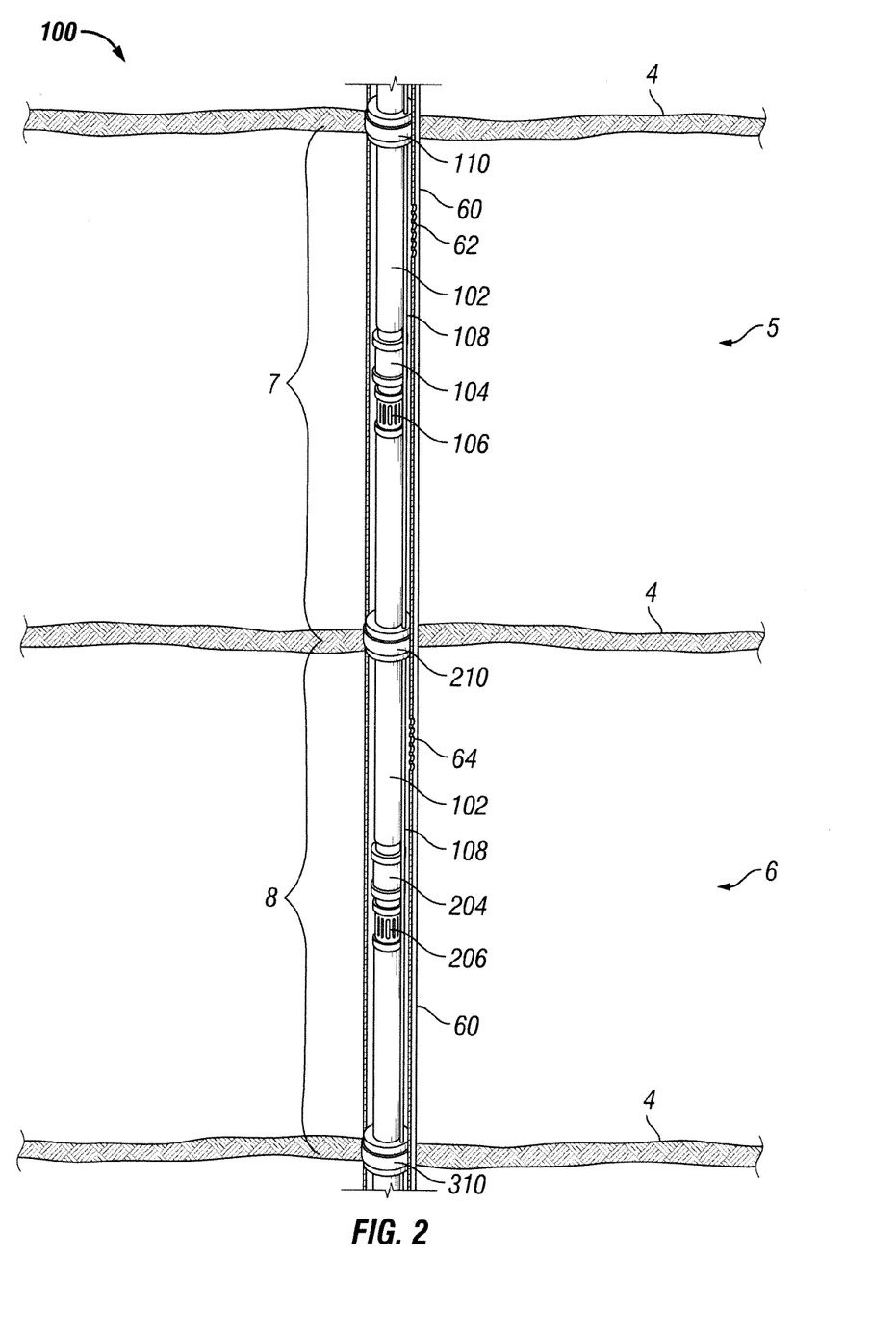
FIG. 2 illustrates dielectric spectrometers incorporated into the production tubing of a wellbore at two different zones in accordance with one or more embodiments of the present disclosure.

Referring now to FIG. 2, an illustration of a reservoir production management system 100 in accordance with one or more embodiments of the present disclosure is shown. After drilling and casing a well, it must be "completed." Completion is the process in which the well is enabled to produce oil or gas. In a cased-hole completion, small holes called perforations 62 are made in the portion of the casing 60 that passes through a producing or production zone to provide a path for the oil to flow from the surrounding reservoir into the casing 60 in the wellbore. After a flow path is made, acids and fracturing fluids may be pumped into the wellbore to fracture, clean, or otherwise prepare and stimulate the reservoir rock to optimally produce hydrocarbons into the wellbore. Finally, the area above the reservoir section of the wellbore is packed off inside the casing 60 with one or more isolation packers 110, 210, and 310, and connected to the surface via a smaller diameter pipe called production tubing 102.

A packer is a device that may be run into a wellbore with a smaller initial outside diameter that then expands externally to seal the wellbore, which is known as "setting" the packer in the wellbore. Packers may employ flexible, elastomeric elements that expand. For example, one type of packer is a production or test packer, expansion of which may be accomplished by squeezing the elastomeric elements (which may be somewhat doughnut shaped) between two plates, forcing the sides to bulge outward. Another type of packer is an inflatable packer, expansion of which may be accomplished by pumping a fluid into a bladder. Production or test packers may be set in cased holes, while inflatable packers may be used in open or cased holes.

This arrangement may provide a redundant barrier to leaks of hydrocarbons as well as allow damaged sections of production tubing and/or casing to be replaced. Also, the smaller cross-sectional area of the production tubing 102 produces reservoir fluids at an increased velocity in order to minimize liquid fallback that may create additional back pressure, and shields the casing from corrosive well fluids.

FIG. 2 illustrates two producing reservoirs 5 and 6 in the formation through which casing 60 and production tubing 102 extend. A petroleum reservoir, or oil and gas reservoir, is a subsurface pool of hydrocarbons contained in porous or fractured rock formations. The naturally occurring hydrocarbons, such as crude oil or natural gas, are trapped by overlying rock formations with lower permeability. "Traps" form when the buoyancy forces driving the upward migration of hydrocarbons through a permeable rock cannot overcome the capillary forces of a sealing medium. Petroleum geologists broadly classify traps into three categories based on their geological characteristics: the structural trap, the stratigraphic trap, and the hydrodynamic trap. Structural traps may be formed as a result of changes in the structure of the subsurface due to processes such as folding and faulting, leading to the formation of domes, anticlines, and folds. Examples of this kind of trap are an anti-cline trap, a fault trap, and a salt dome trap. Stratigraphic traps are formed as a result of lateral and vertical variations in the thickness, texture, porosity or lithology of the reservoir rock. Examples of this type of trap are an unconformity trap, a lens trap, and a reef trap. Hydrodynamic traps are a less common type of trap. They are caused by the differences in water pressure that are associated with water flow, creating a tilt of the hydrocarbon-water contact.

A "seal" is a fundamental part of the trap that prevents hydrocarbons from further upward migration. A capillary seal is formed when the capillary pressure across the pore throats is greater than or equal to the buoyancy pressure of the migrating hydrocarbons. They do not allow fluids to migrate across them until their integrity is disrupted, causing them to leak. There are two types of capillary seal whose classifications are based on the preferential mechanism of leaking: the hydraulic seal and the membrane seal. The membrane seal will leak whenever the pressure differential across the seal exceeds the threshold displacement pressure, allowing fluids to migrate through the pore spaces in the seal. The hydraulic seal occurs in rocks that have a significantly higher displacement pressure such that the pressure required for tension fracturing is actually lower than the pressure required for fluid displacement (e.g., evaporites or very tight shales).

Thus, as shown in FIG. 2, producing reservoirs 5 and 6 have traps 4 above and below the producing reservoirs 5 and 6 such that producing reservoirs are not in fluid communication with each other (i.e., fluid from reservoir 5 may not pass to reservoir 6, and vice versa). Producing reservoirs 5 and 6 may be produced through production tubing 102, which extends through casing 60 of the wellbore. FIG. 2 also shows two zones 7 and 8 created within casing 60 with isolation packers 110, 210, and 310. A first casing zone 7 is created between isolation packers 110 and 210 within wellbore casing 60. Similarly, a second casing zone 8 is created between isolation packers 210 and 310 within wellbore casing 60. Moreover, producing reservoirs 5 and 6 flow exclusively into casing zones 7 and 8, respectively (due to traps 4). Stated otherwise, casing zone 7 is in fluid communication with producing reservoir 5 exclusively, and casing zone 8 is in fluid communication with producing reservoir 6 exclusively. Casing zones within the wellbore may vary in length in the wellbore. For example, casing zones may be at least 5, 10, 50, or 100 feet in length, and up to 1,000, 3,000, 5,000, or 10,000 feet in length.

Each casing zone 7 and 8 contains a control valve 106, 206 and a dielectric spectrometer 104, 204, respectively. A tubing encapsulated cable 108 may be deployed in the annular space between the casing 60 and the production tubing 102 to provide power and telemetry abilities from the spectrometers to the top of the wellbore. The control valves 106, 206 control fluid flow from an annulus of the wellbore (i.e., the space between the production tubing 102 and the casing 60) into the production tubing 102, such that the fluid flows upward to the surface. Thus, fluid from producing reservoir 5, which has flowed into casing zone 7 through perforations 62, flows into production tubing 102 through valve 106 and upward through dielectric spectrometer 104. Likewise, fluid from producing reservoir 6, which has flowed into casing zone 8 through perforations 64, flows into production tubing 102 through valve 206 and upward through dielectric spectrometer 204.

The control valves 106, 206, in accordance with one or more embodiments disclosed herein, may be hydraulically actuated valves with sliding sleeves (not shown) that are translated or moved within the valve to open and close one or more ports or orifices to allow fluid to flow there through. The sleeve may slide axially within a control valve body, or may rotate within the control valve body to open and close one more fluid ports. Other control valves that may be used include, but are not limited to, gate valves, ball valves, needle valves, and other known valve types that may be hydraulically, electrically, or pneumatically operated.

In one embodiment, one or more dielectric spectrometers 104, 204 may be installed on production tubing 102 in a wellbore. The dielectric spectrometers may be associated with production tubing 102 and located inside the casing 60 of the wellbore. It may be desirable to employ dielectric spectrometers in each zone (i.e., casing zones 7 and 8) to analyze fluid produced from each producing zone (i.e., producing zones 5 and 6). Spectrometers 104, 204 may be located proximate to or adjacent control valves 106, 206, respectively, which may be configured to open and close the production tubing 102 to production of fluids from a particular producing zone of the subterranean formation. The operation of the valve may represent actions taken in response to the analysis of fluids being produced from a given zone at a particular point in time, as will be discussed further.

Spectrometers 104, 204 may include at least one multi-frequency radio transmitter and receiver, which are positioned and fixed within the production tubing 102. The multi-frequency transmitter and receiver may be configured to interact upon the flow of production fluids within the production tubing 102 and through the dielectric spectrometers. Communication may be obtained by way of a coaxial cable 108 or by way of antennas located in a controlled section of tubing. In other embodiments, magnets in association with wire coils may be employed.

Figure 3:
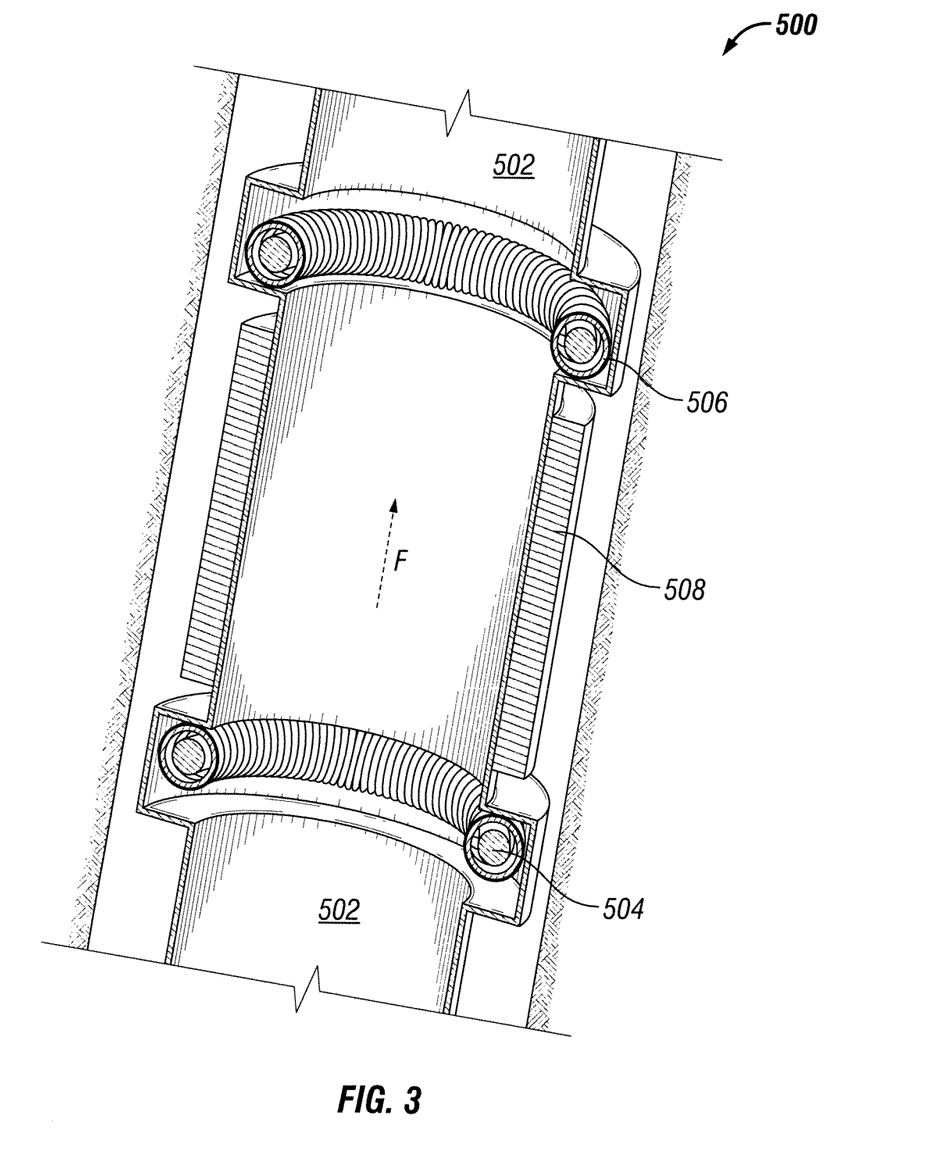
FIG. 3 illustrates a cross-sectional of a dielectric spectrometer that may be employed in accordance with one or more embodiments of the present disclosure.

FIG. 3 shows a cross-sectional view of an electromagnetic induction based downhole dielectric spectrometer 500 employed in association with production tubing and installed in the wellbore in accordance with one or more embodiments of the present disclosure. The dielectric spectrometer 500 may be attached or coupled to the production tubing 102 (FIG. 2) at attachment ends 502 by welding, threading, or other attachment means known by one of ordinary skill in the art. The spectrometer 500 includes a forcing electrode 504, where voltage is applied. For example, a function generator may induce a multi-frequency signal (e.g., a "chirp" signal). Spectrometer 500 also includes a measuring electrode 506, where current is induced. The measuring electrode 506 may be used to measure a response in the fluid (i.e., with a voltmeter or amp meter). The measuring electrode 506 is located downstream of forcing electrode 504, as shown by fluid flow 'F.'

Additionally, the spectrometer 500 includes an electronics package 508 for analysis and operation of the dielectric spectrometer 500. Some of the electronics are those common to frequency or wave generators, with the ability to induce an alternating electric field or current onto the selected probe configuration. The electronics package 508 may also include components and circuits similar to the packages used in signal analysis, where a voltmeter and ammeter are employed accordingly to record the response electric field or current used to assess wellbore fluid. The electronics package 508 may include, but is not limited to, any circuit or component necessary for data processing, data transmission, feedback control, or other tasks deemed crucial for the described system to function. These may include a processor, local memory storage, among a few electronic components.

Referring back to FIG. 2, the dielectric spectrometers 104, 204 may be installed in-line with the production tubing 102 such the spectrometers have a diameter that is substantially the same as the diameter of the production tubing 102. Thus, maximum fluid capacity or flow passes through the dielectric spectrometer 104, 204. Alternatively, a diameter of the spectrometers may be less than a diameter of the production tubing 102, or greater than a diameter of the production tubing 102. Moreover, spectrometers 104, 204 may be located downstream from the control valves 106, 206, as shown. In other embodiments, the spectrometers may be located upstream of the control valves. Still further, in certain embodiments, the spectrometers may be located in an annulus between the production tubing 102 and the casing 60 upstream of the control valves. In addition, while one spectrometer and control valve are shown associated with each reservoir producing zone, it will be understood that two or more spectrometers and/or control valves may be associated with each producing zone. Furthermore, while only two producing zones are shown, and thus two spectrometers and control valves, it will be understood that more than two, such as five, ten, or more spectrometers and control valves may be used.

In still other embodiments, dielectric spectrometers may be located in a sidewall of the production tubing 102, such as for example, what may be termed a "bypass" configuration. In the bypass configuration, a small channel or groove may be formed in the sidewall of the production tubing 102 to reroute fluid from a main bore of the production tubing 102 through the bypass channel or groove (not shown). Dielectric spectrometers may be located in the bypass channel or groove to measure fluid properties. Bypass channel or groove may have a diameter less than the diameter of the main bore of the production tubing 102. Additionally, bypass channel or groove may have any number of cross-sectional geometries, including, but not limited to, circular, elliptical, polygonal, etc. Still further, dielectric spectrometers may be arranged in any suitable manner as known to those skilled in the art such that a fluid passes through a forcing electrode and a measuring electrode having a constant spatial relationship or distance there between to detect fluid properties.

In accordance with one or more embodiments disclosed herein, various analysis components may be used, including a digital and/or analog system. For example, electronics package 508 (FIG. 3) of the dielectric spectrometer and surface equipment may include an analog or digital system. The system may have components such as a processor, storage media, memory, input, output, communications link (wired, wireless, pulsed mud, optical, or others), user interfaces, software programs, signal processors (digital or analog) and other such components (such as resistors, capacitors, inductors, and others) to provide for operation and analyses of the system and methods described herein in accordance with one or more embodiments. The various analysis components may be implemented in conjunction with a set of computer executable instructions stored on a computer readable medium, including memory (ROMs, RAMs) optical (CD-ROMs), or magnetic (disks, hard drives), or any other type that when executed causes a computer to implement the methods of one or more embodiments disclosed herein. These instructions may provide for equipment operation, control, data collection and analysis and other functions deemed relevant by a system designer, owner, user, or other such personnel, in addition to other functions described herein.

By employment of the reservoir production management system described in accordance with one or more embodiments herein, it may be possible to assess the multiphase flow ratios of water, oil, gas, and solids that allow the equipment to infer the characterization of each such component in the produced fluids. Density changes may be measured by phase shift of a constant alternating electromagnetic signal as the flow passes the measuring electrode of the apparatus. It may be possible to infer the temperature or pressure of the downhole produced fluids by way of analysis of the measured signals.

Figure 4:
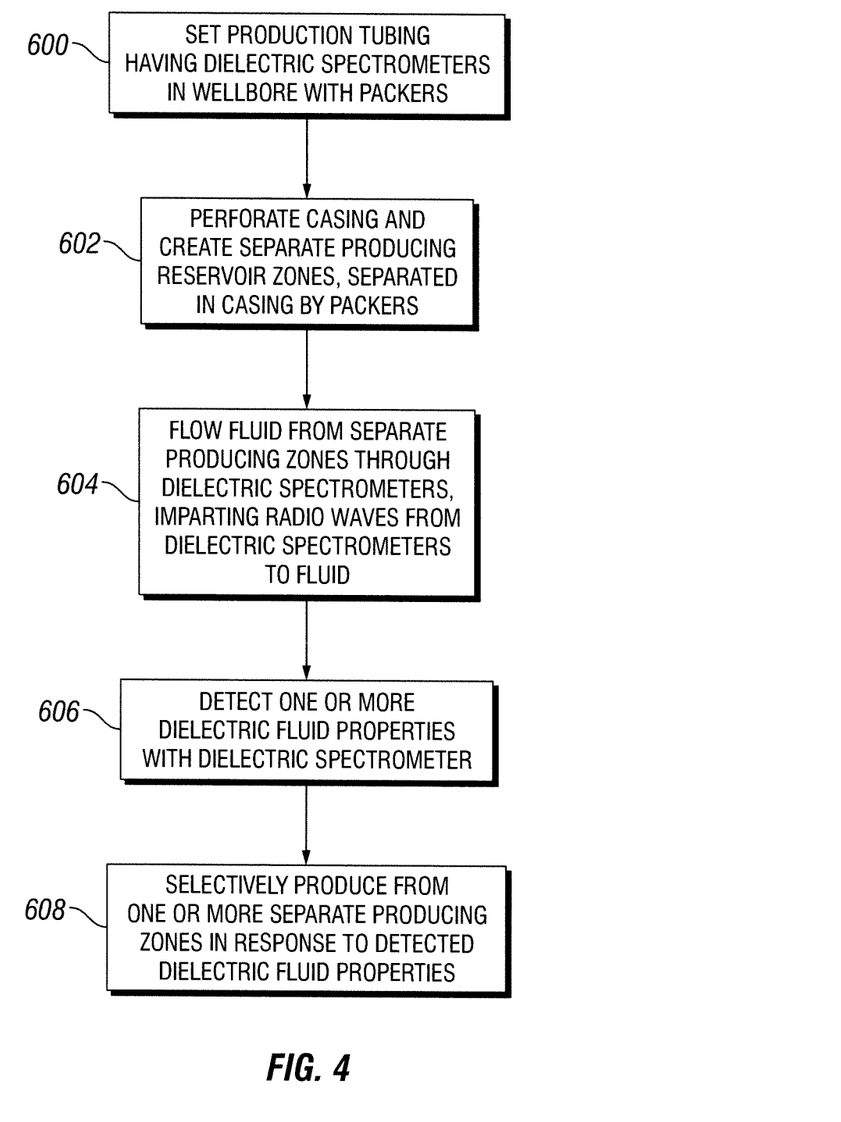
FIG. 4 illustrates a flowchart of methods of reservoir production management in accordance with one or more embodiments of the present disclosure.

Referring now to FIGS. 2 and 4 together, methods of using the system described in accordance with one or more embodiments herein are now discussed. A method of managing reservoir production includes providing a production tubing 102 having a plurality of dielectric spectrometers 104, 204 at different locations along the length of production tubing 102 in a wellbore. Initially, during completion operations, production tubing 102, having dielectric spectrometers 104, 204, is set in casing 60 of the wellbore with multiple isolation packers 110, 210, 310, indicated at step 600. The casing 60 is then perforated (shown by perforations 62 and 64), and separate producing casing zones 7, 8 are created between isolation packers 110, 210, 310 in the casing 60 for producing from separate reservoirs 5, 6 in the rock formation, indicated at step 602.

Each of the dielectric spectrometers 104, 204 are in fluid communication with separate producing zones 5, 6 of the reservoir, respectively. The fluid from the separate producing zones flows through the dielectric spectrometers 104, 204 where radio waves are imparted to the fluid with the plurality of dielectric spectrometers, indicated at step 604. One or more dielectric fluid properties are detected with the plurality of dielectric spectrometers 104, 204 indicated at step 606. As used herein, "dielectric fluid properties" may refer to, but are not limited to, water/oil ratio, water/oil/gas ratio, density of fluids, fluid identification, water/oil/gas/solids ratio, and others.

Figure 5:
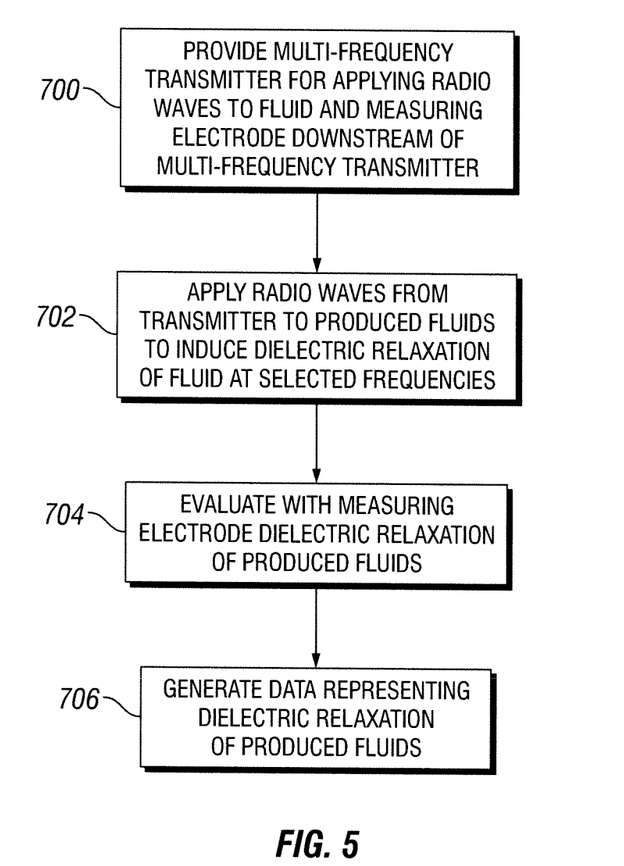
FIG. 5 illustrates a flowchart of methods of analyzing production fluids using dielectric spectroscopy in accordance with one or more embodiments of the present disclosure.

Referring now to FIG. 5, methods of detecting one or more dielectric fluid properties in accordance with one or more embodiments herein are discussed in greater detail. For detecting one or more dielectric properties, a multi-frequency transmitter installed in each of the multiple dielectric spectrometers, indicated at step 700, the multi-frequency transmitter being configured for applying radio waves of various frequencies to fluids. Additionally, a measuring electrode is installed in each of the dielectric spectrometers downstream of the multi-frequency transmitter, the measuring electrode being induced by current and configured for detection of dielectric properties in the fluids.

Radio wave frequencies from the multi-frequency transmitter are applied to the produced fluids to induce dielectric relaxation in the fluids at the selected frequencies, indicated at step 702. From the induced dielectric relaxation and/or response of the fluids at selected frequencies, the dielectric relaxation may be evaluated, indicated at step 704, either by data analysis programs or operator personnel. Finally, data may be generated that represents dielectric relaxation of the fluids, indicated at step 706.

Referring back to FIG. 4, in response to the detected dielectric fluid properties, fluid from one or more separate producing zones may be selectively produced through the production tubing, indicated at step 608. As used herein, "selective production" may refer to opening and/or closing one or more control valves in the production tubing in response to dielectric fluid properties detected by one or more dielectric spectrometers located proximate to the control valves. As such, production is selective due to the fact that production may be allowed from certain producing reservoirs with desirable or favorable dielectric fluid properties, while production may be prevented or regulated from certain producing reservoirs with undesirable or unfavorable fluid properties. In response, control valves located proximate to the dielectric spectrometers may be opened or closed to increase or decrease fluid production from a particular producing reservoir zone.

For example, if a particular producing reservoir zone begins producing excess water (i.e., detection of dielectric fluid property of water/oil ratio), the dielectric spectrometer in the casing zone that is in fluid communication with the reservoir producing excess water will detect the increased water production and transmit this detection to an operator. In response, the operator may close the control valve (fully or partially) in that zone to decrease the amount of fluid production from that particular reservoir zone, or shut it off entirely. In the meantime, other reservoir zones, which are producing acceptable levels or ratios of oil and water, may continue to produce at full capacity (i.e., control valves are fully open).

For example, in facilities in which water production from a reservoir is undesirable, water production beyond about 5% may be considered an unfavorable fluid property. In other examples, in facilities in which water production from a reservoir is not undesirable, then the restriction factor would be maintaining a constant water ratio in the entire completion. For instance, producing zones one, two, and three should be producing the same or about the same amount of water, ±5 to 15% water. Thus, in the event that zone 1 is producing 5% water, and zone 2 is producing 30% water, zone 2 may be choked back (with control valves) to reduce production from zone 2 and allow zone 1 to produce more.

Figure 6:
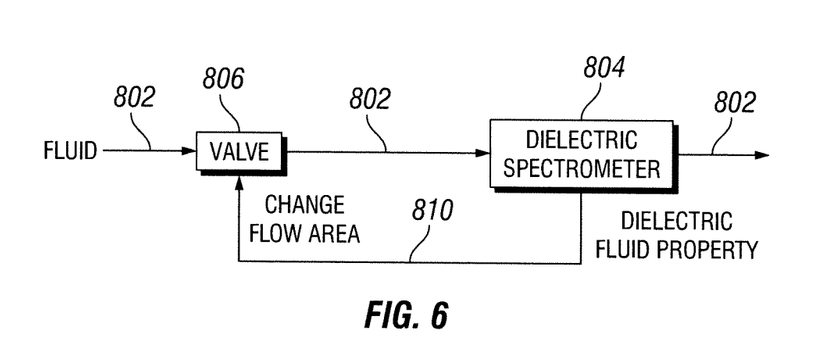
FIG. 6 illustrates a control loop of the reservoir production management system described in accordance with one or more embodiments of the present disclosure.

FIG. 6 shows a control loop 800 for a dielectric spectrometer 804 and a control valve 806 in a particular casing zone of the reservoir production management system in accordance with one or more embodiments of the present disclosure. As shown, fluid in production tubing 802 passes through control valve 806 and continues through dielectric spectrometer 804, where one or more dielectric fluid properties are detected by imparting radio waves at selected frequencies on the fluid. In response to an undesirable detected fluid properties, a signal may be sent through feedback loop 810 to adjust the control valve 806 (i.e., either open or close) to change the flow area or volume through the control valve 806, thus affecting production from the particular reservoir zone with which the control valve 806 is in fluid communication. Or, if the dielectric spectrometer 804 detects a desirable fluid property, no signal is sent to adjust the valve and no action is taken. In certain embodiments, signals may automatically be sent through feedback loop 810, i.e., an algorithm makes adjustments to the control valve 806 in response to a particular fluid property detected in the dielectric spectrometer 804 exceeding a particular level. Those skilled in the art will be familiar with control logic and algorithms that may be implemented with the feedback loop 810. Otherwise, the feedback loop 810 may be controlled through human intervention (i.e., "human in the loop").

In accordance with one or more embodiments disclosed herein, production of any number of reservoirs may be permitted or prevented using the reservoir production management system disclosed herein. For example, in certain embodiments, a formation may include 2, 5, 10, or more separate producing reservoirs, each of which may be produced separately through the production tubing. Any variation or combination of reservoirs may be produced, such as adjacent reservoirs, non-adjacent reservoirs, alternating reservoirs, or any others as determined by an operator having an overall reservoir production management strategy.

Systems and methods of the one or more embodiments disclosed herein may provide a number of advantages. The well operator may distinguish the producing fluids with dielectric spectrometers by properties that may include water cut, oil/gas ratio, density, or other fluids properties for fluid being transported within the tubing in each zone. The system facilitates greater control and optimization of the reservoir, and may provide for the ability to control the water cut, oil/gas ratios, oil/gas/solids ratios, oil/gas/water/solids ratios and others with one or more control valves.

Another advantage is use in secondary recovery operations. Enhanced recovery methods such as water flooding, steam flooding, or CO2 flooding may be used to increase reservoir pressure and provide a "sweep" effect to push hydrocarbons out of the reservoir. Such methods may require use of injection wells (often chosen from old production wells in a carefully determined pattern), and may be used when facing problems with reservoir pressure depletion, high oil viscosity, or may even be employed early in a field's life for various reasons. In certain cases, depending on the reservoir's geomechanics, reservoir engineers may determine that ultimate recoverable oil may be increased by applying a water-flooding strategy early in the field's development rather than later. Such enhanced recovery techniques are often called "tertiary recovery."

During a sweep of a reservoir, it is desirable to have an even sweep through the reservoir (i.e., water pumped through different zones of the reservoir travels at approximately the same speed). In the event that during a reservoir sweep, an operator determines that water has travelled faster through a particular reservoir zone, the control valve in fluid communication with said zone may be choked down or closed (either partially or fully) to decrease flow through the reservoir in an attempt to let other slower moving sweeps catch up.

Additionally, embodiments disclosed herein may be useful for reservoir pressure management. For example, pressure and/or temperature sensors may also be included with or in place of dielectric spectrometers to monitor produced fluid pressures and temperatures. In the event of a pressure spike in a particular producing zone, a control valve in fluid communication with said producing zone may be closed to stop production in that zone and prevent a safety hazard of a blowout.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention.

What is claimed is:

1. A reservoir production management system comprising:
a plurality of dielectric spectrometers substantially in-line with the length of production tubing within a wellbore, each of the plurality of dielectric spectrometers being in fluid communication with separate producing zones of the reservoir,
wherein the plurality of dielectric spectrometers are configured to detect one or more dielectric properties by measuring the response of a plurality of frequencies of incident radio waves through fluids from each of the respectively separate producing zones; and
a plurality of valves in the production tubing to selectively control production from each of the respectively separate producing zones in response to detected dielectric fluid properties; wherein the chemical composition of a fluid is identified by determining the frequencies where resonances occur.

2. The system of claim 1, wherein the dielectric properties may be selected from a group consisting of water/oil ratio, water/oil/gas ratio, density of fluids, fluid identification, and water/oil/gas solids ratio.

3. The system of claim 1, wherein the production tubing is permanently affixed in the wellbore.

4. The system of claim 1, further comprising a plurality of packers creating separate producing zones within the wellbore.

5. The system of claim 4, wherein the separate producing zones within the wellbore are between about 50 feet and 3,000 feet in length.

6. The system of claim 1, wherein each of the plurality of dielectric spectrometers comprises:
a multi-frequency transmitter circumferentially arranged in the production tubing configured for applying radio waves of varying frequencies to fluids;
a measuring electrode downstream of the multi-frequency transmitter and circumferentially arranged in the production tubing, the measuring electrode being configured for detection of dielectric properties imparted to the fluids by radio wave impingement upon the fluids, and
an electronics module configured for receiving data signals from the measuring electrode.

7. The system of claim 1, further comprising a coaxial cable or wireless transmitters and receivers configured to provide downhole communication to the plurality of dielectric spectrometers.

8. A reservoir production management system comprising:
a first dielectric spectrometer disposed substantially in-line with production tubing at a first location, the first dielectric spectrometer being in fluid communication with a first producing zone of the reservoir,
wherein the first dielectric spectrometer is configured to detect one or more dielectric properties by measuring the response of a plurality of frequencies of incident radio waves through fluids from the first producing zone;
a second dielectric spectrometer disposed substantially in-line with production tubing at a second location, the second dielectric spectrometer being in fluid communication with a second producing zone of the reservoir,
wherein the second dielectric spectrometer is configured to detect one or more dielectric properties by measuring the response of a plurality of frequencies of incident radio waves through fluids from the second producing zone; and
one or more valves in the production tubing to selectively produce from either or both the first or second producing zones in response to detected dielectric fluid properties; wherein the chemical composition of a fluid is identified by determining the frequencies where resonances occur.

9. The system of claim 8, wherein the first and second dielectric spectrometers each comprise:
a multi-frequency transmitter circumferentially arranged in the production tubing and configured for applying radio waves of varying frequencies to fluids;
a measuring electrode downstream of the multi-frequency transmitter and circumferentially arranged in the production tubing, the measuring electrode being configured for detection of dielectric properties imparted to the fluids by radio wave impingement upon the fluids; and
an electronics module configured for receiving data signals from the measuring electrode.

10. The system of claim 9, wherein the radio waves vary in frequency from about 1 Hz to about 10 GHz.

11. The system of claim 8, wherein the production tubing is permanently affixed in the wellbore.

12. The system of claim 8, further comprising a coaxial cable or wireless transmitters and receivers configured to provide downhole communication to the first and second dielectric spectrometers.

13. The system of claim 8, further comprising one or more packers creating separate producing zones within the wellbore.

14. The system of claim 13, wherein the separate producing zones within the wellbore are between about 50 feet and 3,000 feet in length.

15. A method of managing reservoir production, the method comprising:
providing a plurality of dielectric spectrometers substantially in-line with production tubing in a wellbore, each of the plurality of dielectric spectrometers being in fluid communication with separate producing zones of the reservoir;

measuring a response of a plurality of frequencies of incident radio waves through fluid with the plurality of dielectric spectrometers to fluids flowing therethrough from each of the separate producing zones;

detecting one or more dielectric fluid properties with the plurality of dielectric spectrometers; and selectively producing fluid from one or more of the separate producing zones in response to detected dielectric fluid properties; wherein the chemical composition of a fluid is identified by determining the frequencies where resonances occur.

16. The method of claim 15, wherein detecting one or more dielectric properties comprises:

providing a multi-frequency transmitter circumferentially arranged in each of the multiple dielectric spectrometers, the multi-frequency transmitter being configured for applying radio waves of various frequencies to fluids;

providing a measuring electrode circumferentially arranged in the wellbore downstream of the multi-frequency transmitter, the measuring electrode being induced by current and configured for detection of dielectric properties in the fluids;

applying radio wave frequencies from the transmitter to the produced fluids to induce dielectric relaxation in the fluids at the selected frequencies;

evaluating with the measuring electrode dielectric relaxation of the fluids; and generating data representing dielectric relaxation of the fluids.

17. The method of claim 16, further comprising varying radio wave frequency from about 1 Hz to about 10 GHz.

18. The method of claim 15, wherein selectively producing fluid from one or more of the separate producing zones comprises opening and closing one or more valves in the production tubing located proximate to each of the plurality of dielectric spectrometers.

19. The method of claim 15, further comprising setting packers in the wellbore and creating separate producing zones within the production tubing.

20. The method of claim 15, further comprising permanently affixing the production tubing within the wellbore.

* * * * *